US012494507B2

(12) United States Patent
Wu et al.

(10) Patent No.: US 12,494,507 B2
(45) Date of Patent: Dec. 9, 2025

(54) FLAME RETARDANTS FOR BATTERY ELECTROLYTES

(71) Applicant: Albemarle Corporation, Charlotte, NC (US)

(72) Inventors: Tse-Chong Wu, Conroe, TX (US);
Zhongxin Ge, Baton Rouge, LA (US);
Sascha Joerg Welz, Phoenix, AZ (US);
Mark Timothy Bennett, Baton Rouge, LA (US)

(73) Assignee: ALBEMARLE CORPORATION, Charlotte, NC (US)

( * ) Notice: Subject to any disclaimer, the term of this patent is extended or adjusted under 35 U.S.C. 154(b) by 705 days.

(21) Appl. No.: 17/777,361

(22) PCT Filed: Nov. 18, 2020

(86) PCT No.: PCT/US2020/060946
§ 371 (c)(1),
(2) Date: May 17, 2022

(87) PCT Pub. No.: WO2021/101925
PCT Pub. Date: May 27, 2021

(65) Prior Publication Data
US 2023/0024232 A1    Jan. 26, 2023

Related U.S. Application Data

(60) Provisional application No. 62/936,714, filed on Nov. 18, 2019.

(51) Int. Cl.
| *H01M 10/0567* | (2010.01) |
| *H01M 10/0525* | (2010.01) |
| *H01M 10/0568* | (2010.01) |
| *H01M 50/00* | (2021.01) |

(52) U.S. Cl.
CPC ... *H01M 10/0567* (2013.01); *H01M 10/0525* (2013.01); *H01M 10/0568* (2013.01); *H01M 50/00* (2021.01); *H01M 2300/0025* (2013.01); *Y02E 60/10* (2013.01)

(58) Field of Classification Search
CPC ......... H01M 10/0525; H01M 10/0567; H01M 10/0568; H01M 2300/0025; H01M 50/00; Y02E 60/10
See application file for complete search history.

(56) References Cited

U.S. PATENT DOCUMENTS

| 8,173,305 | B2 | 5/2012 | Holzapfel et al. |
| 9,130,245 | B2 | 9/2015 | Utsumi |
| 9,657,172 | B2 | 5/2017 | Cao et al. |
| 2002/0034678 | A1* | 3/2002 | Shibuya ............ H01M 10/0569 429/231.1 |
| 2005/0209357 | A1 | 9/2005 | Xu et al. |
| 2006/0003232 | A1 | 1/2006 | Jung et al. |
| 2006/0292450 | A1 | 12/2006 | Nakanishi et al. |
| 2008/0085454 | A1 | 4/2008 | Ihara et al. |
| 2008/0138700 | A1 | 6/2008 | Horpel et al. |
| 2009/0123849 | A1 | 5/2009 | Yamaguchi et al. |
| 2011/0319507 | A1 | 12/2011 | Onishi |
| 2013/0059178 | A1 | 3/2013 | Ihara |
| 2014/0065476 | A1 | 3/2014 | Kim et al. |
| 2014/0295288 | A1 | 10/2014 | Ding |
| 2015/0118543 | A1 | 4/2015 | Kim et al. |
| 2015/0244028 | A1 | 8/2015 | Utsumi et al. |
| 2016/0020489 | A1 | 1/2016 | Rhodes et al. |
| 2016/0257886 | A1 | 9/2016 | Gangi |
| 2017/0040577 | A1 | 2/2017 | Kim et al. |
| 2017/0170519 | A1 | 6/2017 | Ihara |
| 2017/0346127 | A1 | 11/2017 | Zhang et al. |
| 2018/0183104 | A1 | 6/2018 | Fujii |
| 2018/0183359 | A1 | 6/2018 | Krause |
| 2018/0241026 | A1 | 8/2018 | Shibutani |
| 2020/0335825 | A1 | 10/2020 | Hancock et al. |

FOREIGN PATENT DOCUMENTS

| CN | 101415761 A | 4/2009 |
| CN | 102017270 A | 4/2011 |
| CN | 102138245 A | 7/2011 |
| CN | 1023234566 A | 1/2012 |
| CN | 102522590 A | 6/2012 |
| CN | 102832408 A | 12/2012 |
| CN | 102983359 | 3/2013 |
| CN | 103050730 A | 4/2013 |
| CN | 104205470 A | 12/2014 |
| CN | 105742728 A | 7/2016 |
| CN | 106748882 A | 5/2017 |
| CN | 106785126 A | 5/2017 |
| CN | 107834109 A | 3/2018 |

(Continued)

OTHER PUBLICATIONS

Khazhiev et al., "Conformational Analysis of 5,5-Bis(halomethyl)-1,3-dioxanes," Russian Journal of Organic Chemistry, vol. 53, No. 5: 717-719 (2017).
Japanese Office Action for JP Application No. 2022-528994, dated Jan. 22, 2025, 11 pages.
Chinese Automotive Technology & Research Centre et al., "Handbook of Energy-efficient and New Energy Automobiles," China Economic Publishing House, p. 33 (Dec. 2012).
Chinese Decision on Rejection for CN Application No. 202080079808.7, dated Oct. 22, 2024, 33 pages.
Chinese National Intellectual Property Administration Second Office Action in CN Application No. 202080079798.7, dated Jul. 15, 2024, 15 pages.

(Continued)

*Primary Examiner* — Lingwen R Zeng
(74) *Attorney, Agent, or Firm* — KDW Firm PLLC

(57) ABSTRACT

This invention provides nonaqueous electrolyte solutions for lithium batteries. The nonaqueous electrolyte solutions comprise a liquid electrolyte medium; a lithium-containing salt; 4-bromomethyl-1,3-dioxolan-2-one, and at least one electrochemical additive.

20 Claims, No Drawings

(56) References Cited

FOREIGN PATENT DOCUMENTS

| | | |
|---|---|---|
| CN | 108183257 A | 6/2018 |
| CN | 109830752 A | 5/2019 |
| CN | 109860712 A | 6/2019 |
| CN | 109950625 A | 6/2019 |
| EP | 0 631 339 A2 | 12/1994 |
| EP | 0869394 A1 | 10/1998 |
| JP | S-62-217567 A | 9/1987 |
| JP | H-06-283205 A | 10/1994 |
| JP | H-10-247519 A | 9/1998 |
| JP | H-11-40199 A | 2/1999 |
| JP | H1140193 A | 2/1999 |
| JP | H11040195 A | 2/1999 |
| JP | H-11-95429 A | 7/1999 |
| JP | 2000188128 A | 7/2000 |
| JP | 2000195544 A | 7/2000 |
| JP | H11162511 A | 7/2000 |
| JP | 2005038722 A | 2/2005 |
| JP | 2009076467 A | 4/2009 |
| JP | 2010073595 A | 4/2010 |
| JP | 2014011095 A | 1/2014 |
| JP | 2014049297 A | 3/2014 |
| JP | 2014532285 A | 12/2014 |
| JP | 2019003799 A | 1/2019 |
| KR | 10-2013-0064031 A | 6/2013 |
| KR | 20170056699 A | 5/2017 |
| RU | 2016 119 997 A | 11/2017 |
| TW | 201626631 A | 7/2016 |
| WO | 2017141806 A1 | 8/2017 |
| WO | 2017/210593 A1 | 12/2017 |
| WO | 2019/005837 A1 | 1/2019 |
| WO | 2019199403 A1 | 10/2019 |
| WO | 2020/000888 A1 | 1/2020 |

OTHER PUBLICATIONS

Registry (STN), "Carbonic acid, bromomethyl methyl ester," CAS RN® 207804-62-4, [online], 3 pages (Jul. 1998).
Japanese Office Action for JP Application No. 2022-528998, dated Nov. 27, 2024, 9 pages.
Japanese Office Action for JP Application No. 2022-528996, dated Dec. 18, 2024, 11 pages.
Taiwanese Opinion of Examination for TW Application No. 109140296, mailed Jun. 12, 2024, 14 pages.
Taiwanese Opinion of Examination for TW Application No. 109140297, mailed Jun. 12, 2024, 15 pages.
Taiwanese Opinion of Examination for TW Application No. 109140298, mailed Jun. 12, 2024, 20 pages.
Otsuki, M., et al., "Flame-Retardant Additives for Lithium-Ion Batteries", Lithium-Ion Batteries, Springer Science + Business Media LLC, 2009, pp. 275-289.
Kilic et al., "Tetrabromobisphenol a Bis(dibromopropyl ether) As a Flame Retardant Additive for Lithium-Ion Batteries," ECS Meeting Abstracts, MA2015-01, 104, A01-Joing General Session: Batteries and Energy Storage-and-Fuel Cells, Electrolytes, and Energy Conversion (2015).
Larsson et al., "Identification of the Brominated Flame Retardant 1,2-Debromo-4-(1,2dibromoethyl)cyclohexane as an Androgen Agonist," Journal of Medicinal Chemistry, vol. 49: 7366-7372 (2006).
Taiwanese Office Action in TW Application No. 109140296 dated May 16, 2025, 7 pages.
Korean Office Action in KR Application No. 10-2022-7016122 dated Aug. 7, 2025, 23 pages.
Registry (STN), "Carbonic acid, 2, 4-dibromophenyl methyl ester," CAS RN® 1865198-88-4 [online], 1 page (Feb. 12, 2016).
Japanese Office Action in JP Application No. 2022-528994 dated Jul. 30, 2025, 3 pages.

\* cited by examiner

FLAME RETARDANTS FOR BATTERY ELECTROLYTES

REFERENCE TO RELATED APPLICATIONS

This application is the National Stage of International Patent Appl. No. PCT/US2020/060946 filed on Nov. 18, 2020, which in turn claims the benefit of U.S. Provisional Patent Appln. No. 62/936,714, filed on Nov. 18, 2019, the disclosures of which are incorporated herein by reference.

TECHNICAL FIELD

This invention relates to brominated flame retardants for electrolyte solutions for batteries.

BACKGROUND

One of the components impacting the safety of lithium-ion batteries is their use of flammable solvents in the lithium-containing electrolyte solutions. Inclusion of a flame retardant in the electrolyte solution is one way to mitigate the flammability of these solutions. For a flame retardant to be a suitable component of an electrolyte solution, solubility in the electrolyte is needed, along with electrochemical stability over the range of battery operation, and minimal negative effect on battery performance. Negative effects on battery performance can include reduced conductivity and/or chemical instability to the active material.

What is desired is a flame retardant that can effectively suppress the flammability of lithium ion batteries with minimal impact to the electrochemical performance of the lithium ion battery at a reasonable cost.

SUMMARY OF THE INVENTION

This invention provides nonaqueous electrolyte solutions for lithium batteries which contain an oxygen-containing brominated flame retardant, namely 4-bromomethyl-1,3-dioxolan-2-one. In the presence of the oxygen-containing brominated flame retardant, fires are extinguished in these nonaqueous electrolyte solutions, at least under laboratory conditions.

An embodiment of this invention is a nonaqueous electrolyte solution for a lithium battery, which solution comprises i) a liquid electrolyte medium; ii) a lithium-containing salt; iii) 4-bromomethyl-1,3-dioxolan-2-one; and iv) at least one electrochemical additive selected from a) unsaturated cyclic carbonates containing three to about six carbon atoms, b) fluorine-containing saturated cyclic carbonates containing three to about five carbon atoms and one to about four fluorine atoms, c) tris(trihydrocarbylsilyl) phosphites containing three to about nine carbon atoms, d) trihydrocarbyl phosphates containing three to about twelve carbon atoms, e) cyclic sultones containing three to about eight carbon atoms, f) saturated cyclic hydrocarbyl sulfites having a 5-membered or 6-membered ring and containing two to about six carbon atoms, g) saturated cyclic hydrocarbyl sulfates having a 5-membered or 6-membered ring and containing two to about six carbon atoms, h) cyclic dioxadithio polyoxide compounds having a 6-membered, 7-membered, or 8-membered ring and containing two to about six carbon atoms, i) another lithium-containing salt, and j) mixtures of any two or more of the foregoing.

Another embodiment of this invention is a nonaqueous electrolyte solution for a lithium battery, which solution comprises i) a liquid electrolyte medium; ii) a lithium-containing salt; iii) 4-bromomethyl-1,3-dioxolan-2-one; and iv) at least one electrochemical additive selected from vinylene carbonate, 4-fluoro-ethylene carbonate, tris(trimethylsilyl)phosphite, triallyl phosphate, 1,3-propane sultone, 1,3-propene sultone, 1,3,2-dioxathiolane 2-oxide, 1,3,2-dioxathiolane 2,2-dioxide, 1,5,2,4-dioxadithiane 2,2,4,4-tetroxide, lithium bis(oxalato)borate, lithium hexafluorophosphate, and mixtures of any two or more of these.

Still another embodiment of this invention is a nonaqueous electrolyte solution for a lithium battery, which solution comprises i) a liquid electrolyte medium; ii) a lithium-containing salt; and iii) 4-bromomethyl-1,3-dioxolan-2-one.

These and other embodiments and features of this invention will be still further apparent from the ensuing description and appended claims.

FURTHER DETAILED DESCRIPTION OF THE INVENTION

Throughout this document, the phrase "electrolyte solution" is used interchangeably with the phrase "nonaqueous electrolyte solution."

The liquid electrolyte medium is comprised of one or more solvents that typically form the liquid electrolyte medium for lithium electrolyte solutions used in lithium batteries, which solvents are polar and aprotic, stable to electrochemical cycling, and preferably have low viscosity. These solvents usually include noncyclic carbonic acid esters, cyclic carbonic acid esters, ethers, sulfur-containing compounds, and esters of boric acid.

The solvents that can form the liquid electrolyte medium in the practice of this invention include ethylene carbonate (1,3-dioxolan-2-one), dimethyl carbonate, ethyl methyl carbonate, diethyl carbonate, dioxolane, dimethoxy ethane (glyme), tetrahydrofuran, methanesulfonyl chloride, 1,3,2-dioxathiolane 2-oxide, 1,3-propylene glycol boric ester, and mixtures of any two or more of the foregoing.

Preferred solvents include ethylene carbonate, ethyl methyl carbonate, and mixtures thereof. More preferred are mixtures of ethylene carbonate and ethyl methyl carbonate, especially at volume ratios of ethylene carbonate:ethyl methyl carbonate ratios of about 20:80 to about 40:60, more preferably about 25:75 to about 35:65.

Suitable lithium-containing salts in the practice of this invention include lithium chloride, lithium bromide, lithium iodide, lithium perchlorate, lithium nitrate, lithium thiocyanate, lithium aluminate, lithium tetrachloroaluminate, lithium tetrafluoroaluminate, lithium tetraphenylborate, lithium tetrafluoroborate, lithium bis(oxalato)borate (LiBOB), lithium di(fluoro)(oxalato)borate, lithium hexafluorophosphate, lithium hexafluoroarsenate, lithium hexafluoroantimonate, lithium titanium oxide, lithium manganese oxide, lithium cobalt oxide ($LiCoO_2$), lithium nickel oxide ($LiNiO_2$), lithium alkyl carbonates in which the alkyl group has 1 to 6 carbon atoms, lithium methylsulfonate, lithium trifluoromethyl sulfonate, lithium pentafluoroethyl sulfonate, lithium pentafluorophenyl sulfonate, lithium fluorosulfonate, lithium bis(trifluoromethyl sulfonyl)imide, lithium bis(pentafluoroethyl sulfonyl)imide, lithium (ethylsulfonyl)(trifluoromethyl-sulfonyl)imide, and mixtures of any two or more of the foregoing. Preferred lithium-containing salts include lithium hexafluorophosphate, lithium di(fluoro)(oxalato)borate, and lithium bis(oxalato)borate.

Typical concentrations for the lithium-containing salt in the electrolyte solution are in the range of about 0.1 M to about 2.5 M, preferably about 0.5 M to about 2 M, more preferably about 0.75 M to about 1.75 M, and still more preferably about 0.95 M to about 1.5 M. When more than one lithium-containing salt forms the lithium-containing electrolyte, the concentration refers to the total concentration of all of the lithium-containing salts present in the electrolyte solution.

The electrolyte solution can contain other salts in addition to lithium salts, unless such other salt(s) materially degrade either the performance of the battery for the desired application, or the flame retardancy of the electrolyte solution. Suitable electrolytes other than lithium salts include other alkali metal salts, e.g., sodium salts, potassium salts, rubidium salts, and cesium salts, and alkaline earth metal salts, e.g., magnesium salts, calcium salts, strontium salts, and barium salts. In some aspects, the salts in the nonaqueous electrolyte solution are only one or more lithium salts.

Suitable alkali metal salts that can be present in the electrolyte solution include sodium salts such as sodium chloride, sodium bromide, sodium iodide, sodium perchlorate, sodium nitrate, sodium thiocyanate, sodium aluminate, sodium tetrachloroaluminate, sodium tetrafluoroaluminate, sodium tetraphenylborate, sodium tetrafluoroborate, and sodium hexafluorophosphate; and potassium salts such as potassium chloride, potassium bromide, potassium iodide, potassium perchlorate, potassium nitrate, potassium thiocyanate, potassium aluminate, potassium tetrachloroaluminate, potassium tetrafluoroaluminate, potassium tetraphenylborate, potassium tetrafluoroborate, and potassium hexafluorophosphate.

Suitable alkaline earth metal salts that can be present in the electrolyte solution include magnesium salts such as magnesium chloride, magnesium bromide, magnesium iodide, magnesium perchlorate, magnesium nitrate, magnesium thiocyanate, magnesium aluminate, magnesium tetrachloroaluminate, magnesium tetrafluoroaluminate, magnesium tetraphenylborate, magnesium tetrafluoroborate, and magnesium hexafluorophosphate; and calcium salts such as calcium chloride, calcium bromide, calcium iodide, calcium perchlorate, calcium nitrate, calcium thiocyanate, calcium aluminate, calcium tetrachloroaluminate, calcium tetrafluoroaluminate, calcium tetraphenylborate, calcium tetrafluoroborate, and calcium hexafluorophosphate.

The oxygen-containing brominated flame retardant in the practice of this invention is 4-bromomethyl-1,3-dioxolan-2-one, which can be represented by the following structural formula:

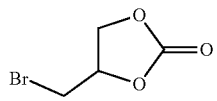

In some instances, 4-bromomethyl-1,3-dioxolan-2-one is referred to by nonstandard names, such as 3-bromo-1,2-propylene carbonate.

In the practice of this invention, 4-bromomethyl-1,3-dioxolan-2-one is miscible with the liquid medium of the nonaqueous electrolyte solution, where "miscible" means that 4-bromomethyl-1,3-dioxolan-2-one does not form a separate phase from the electrolyte solution. More specifically, 4-bromomethyl-1,3-dioxolan-2-one is miscible if it forms a single phase in a mixture of 30 wt % ethylene carbonate and 70 wt % ethyl methyl carbonate which contains 1.2 M lithium hexafluorophosphate, after 24 hours of shaking in a mechanical shaker, and no separate phase is formed after the shaking is stopped, and 4-bromomethyl-1,3-dioxolan-2-one does not precipitate from, or form a suspension or slurry in, the nonaqueous electrolyte solution. It is recommended and preferred that the brominated flame retardant does not cause the precipitation of, or formation of a suspension or slurry of, any of the other components of the nonaqueous electrolyte solution.

In the practice of this invention, a flame retardant amount in the nonaqueous electrolyte solution means enough 4-bromomethyl-1,3-dioxolan-2-one is present that the solution passes the modified horizontal UL-94 test described below. The flame retardant amount is usually about 25 wt % flame retardant molecules, preferably about 26 wt % or more flame retardant molecules, more preferably about 27 wt % or more flame retardant molecules, relative to the total weight of the nonaqueous electrolyte solution. Similarly, the flame retardant amount in terms of bromine content is usually about 11 wt % or more bromine (atoms), preferably about 11.4 wt % or more, more preferably about 11.8 wt % or more, relative to the total weight of the nonaqueous electrolyte solution.

In some embodiments, 4-bromomethyl-1,3-dioxolan-2-one is preferably in an amount of about 11 wt % or more, more preferably about 11.4 wt % or more, even more preferably about 11.8 wt % or more, bromine (atoms) relative to the total weight of the solution. Preferably, the liquid electrolyte medium is ethylene carbonate, ethyl methyl carbonate, or a mixture thereof. More preferably, the lithium-containing salt is lithium hexafluorophosphate, lithium di(fluoro)(oxalato)borate, or lithium bis(oxalato)borate.

In the practice of this invention, the electrochemical additives are soluble in, or miscible with, the liquid medium of the nonaqueous electrolyte solution. Electrochemical additives that are in liquid form are miscible with the liquid medium of the nonaqueous electrolyte solution, where "miscible" means that the electrochemical additives do not form a separate phase from the electrolyte solution. More specifically, an electrochemical additive is miscible if it forms a single phase in a mixture of 30 wt % ethylene carbonate and 70 wt % ethyl methyl carbonate which contains 1.2 M lithium hexafluorophosphate, after 24 hours of shaking in a mechanical shaker, and no separate phase is formed after the shaking is stopped, and the electrochemical additive does not precipitate from, or form a suspension or slurry in, the nonaqueous electrolyte solution.

The term "soluble," usually used for electrochemical additives in solid form, indicates that, once dissolved, the electrochemical additive does not precipitate from, or form a suspension or slurry in, the nonaqueous electrolyte solution. More specifically, an electrochemical additive is soluble if it dissolves in a mixture of 30 wt % ethylene carbonate and 70 wt % ethyl methyl carbonate which contains 1.2 M lithium hexafluorophosphate, after 24 hours of shaking in a mechanical shaker, if no precipitate, suspension, or slurry is formed after the shaking is stopped.

The 4-bromomethyl-1,3-dioxolan-2-one, electrochemical additive, and mixtures thereof are generally stable to electrochemical cycling, and preferably have low viscosities and/or do not significantly increase the viscosity of the electrolyte solution.

In various embodiments, the electrochemical additive is selected from a) unsaturated cyclic carbonates containing three to about four carbon atoms, b) fluorine-containing saturated cyclic carbonates containing three to about four carbon atoms and one to about two fluorine atoms, c) tris(trihydrocarbylsilyl) phosphites containing three to about six carbon atoms, d) trihydrocarbyl phosphates containing three to about nine carbon atoms, e) cyclic sultones containing three to about four carbon atoms, f) saturated cyclic hydrocarbyl sulfites having a 5-membered ring and containing two to about four carbon atoms, g) saturated cyclic hydrocarbyl sulfates having a 5-membered ring and containing two to about four carbon atoms, h) cyclic dioxadithio polyoxide compounds having a 6-membered or 7-membered ring and containing two to about four carbon atoms, i) another lithium-containing salt, and j) mixtures of any two or more of the foregoing.

In various embodiments, the electrochemical additive is selected from a) an unsaturated cyclic carbonate in an amount of about 0.5 wt % to about 12 wt %, relative to the total weight of the nonaqueous electrolyte solution, b) a fluorine-containing saturated cyclic carbonate in an amount of about 0.5 wt % to about 8 wt %, relative to the total weight of the nonaqueous electrolyte solution, c) a tris (trihydrocarbylsilyl) phosphite in an amount of about 0.1 wt % to about 5 wt %, relative to the total weight of the nonaqueous electrolyte solution, d) a trihydrocarbyl phosphate in an amount of about 0.5 wt % to about 5 wt %, relative to the total weight of the nonaqueous electrolyte solution, e) a cyclic sultone in an amount of about 0.25 wt % to about 5 wt %, relative to the total weight of the nonaqueous electrolyte solution, f) a cyclic sultone in an amount of about 0.25 wt % to about 5 wt %, relative to the total weight of the nonaqueous electrolyte solution, g) a saturated cyclic hydrocarbyl sulfite in an amount of about 0.5 wt % to about 5 wt %, relative to the total weight of the nonaqueous electrolyte solution, h) a saturated cyclic hydrocarbyl sulfate in an amount of about 0.25 wt % to about 5 wt %, relative to the total weight of the nonaqueous electrolyte solution, i) a cyclic dioxadithio polyoxide compound in an amount of about 0.5 wt % to about 5 wt %, relative to the total weight of the nonaqueous electrolyte solution, j) another lithium-containing salt in an amount of about 0.5 wt % to about 5 wt %, relative to the total weight of the nonaqueous electrolyte solution, and k) mixtures of any two or more of the foregoing.

In some embodiments, the electrochemical additive is an unsaturated cyclic carbonate containing three to about six carbon atoms, preferably three to about four carbon atoms. Suitable unsaturated cyclic carbonates include vinylene carbonate (1,3-dioxol-2-one), 4-methyl-1,3-dioxol-2-one, and 4,5-dimethyl-1,3-dioxol-2-one; vinylene carbonate is a preferred unsaturated cyclic carbonate. The unsaturated cyclic carbonate is preferably in an amount of about 0.5 wt % to about 12 wt %, more preferably about 0.5 wt % to about 3 wt % or about 8 wt % to about 11 wt %, relative to the total weight of the nonaqueous electrolyte solution.

When the electrochemical additive is a fluorine-containing saturated cyclic carbonate containing three to about five carbon atoms, preferably three to about four carbon atoms, and one to about four fluorine atoms, preferably one to about two fluorine atoms, suitable fluorine-containing saturated cyclic carbonates include 4-fluoro-ethylene carbonate and 4,5-difluoro-ethylene carbonate. Preferably the fluorine-containing saturated cyclic carbonate is 4-fluoro-ethylene carbonate. The fluorine-containing saturated cyclic carbonate is preferably in an amount of about 0.5 wt % to about 8 wt %, more preferably about 1.5 wt % to about 5 wt %, relative to the total weight of the nonaqueous electrolyte solution.

The tris(trihydrocarbylsilyl) phosphite electrochemical additives contain three to about nine carbon atoms, preferably about three to about six carbon atoms; the trihydrocarbylsilyl groups may be the same or different. Suitable tris(trihydrocarbylsilyl) phosphites include tris(trimethylsilyl) phosphite, bis(trimethylsilyl)(triethylsilyl) phosphite, tris(triethylsilyl) phosphite, bis(trimethylsilyl)(triethylsilyl) phosphite, bis(trimethylsilyl)(tri-n-propylsilyl)phosphite, and tris(tri-n-propylsilyl) phosphite; tris(trimethylsilyl) phosphite is a preferred tris(trihydrocarbylsilyl) phosphite. The tris(trihydrocarbylsilyl) phosphite is preferably in an amount of about 0.1 wt % to about 5 wt %, more preferably about 0.15 wt % to about 4 wt %, even more preferably about 0.2 wt % to about 3 wt %, relative to the total weight of the nonaqueous electrolyte solution.

In some embodiments, the electrochemical additive is a trihydrocarbyl phosphate containing three to about twelve carbon atoms, preferably three to about nine carbon atoms. The hydrocarbyl groups can be saturated or unsaturated, and the hydrocarbyl groups in the trihydrocarbyl phosphate may be the same or different. Suitable trihydrocarbyl phosphates include trimethyl phosphate, triethyl phosphate, dimethyl ethyl phosphate, tri-n-propyl phosphate, triallyl phosphate, and trivinyl phosphate; triallyl phosphate is a preferred trihydrocarbyl phosphate. The trihydrocarbyl phosphate is usually in an amount of about 0.5 wt % to about 5 wt %, preferably about 1 wt % to about 5 wt %, more preferably about 2 wt % to about 4 wt %, relative to the total weight of the nonaqueous electrolyte solution.

When the electrochemical additive is a cyclic sultone containing three to about eight carbon atoms, preferably three to about four carbon atoms, suitable cyclic sultones include 1,3-propane sultone (1-propane-1,3-sultone), 1,3-propene sultone (1-propene-1,3-sultone), 1,3-butane sultone (5-methyl-1,2-oxathiolane 2,2-dioxide), 2,4-butane sultone (3-methyl-1,2-oxathiolane 2,2-dioxide), 1,4-butane sultone (1,2-oxathiane 2,2-dioxide), 2-hydroxy-alpha-toluenesulfonic acid sultone (3H-1,2-benzoxathiole 2,2-dioxide), and 1,8-naphthosultone; preferred cyclic sultones include 1,3-propane sultone and 1,3-propene sultone. The cyclic sultone is preferably in an amount of about 0.25 wt % to about 5 wt %, more preferably about 0.5 wt % to about 4 wt %, relative to the total weight of the nonaqueous electrolyte solution. In some embodiments, the cyclic sultone is preferably in an amount of about 1.5 wt % to about 12 wt %, relative to the total weight of the nonaqueous electrolyte solution.

The saturated cyclic hydrocarbyl sulfite electrochemical additive contains two to about six carbon atoms, preferably two to about four carbon atoms, and has a 5-membered or 6-membered ring, preferably a 5-membered ring. One or more substituents can be present on the ring, such as methyl or ethyl groups, preferably one or more methyl groups, more preferably, no substituents are present on the ring. Suitable saturated cyclic hydrocarbyl sulfites include 1,3,2-dioxathiolane 2-oxide (1,2-ethylene sulfite), 1,2-propanediol sulfite (1,2-propylene sulfite), 4,5-dimethyl-1,3,2-dioxathiolane 2-oxide, 1,3,2-dioxathiane 2-oxide, 4-methyl-1,3-dioxathiane 2-oxide (1,3-butylene sulfite); preferred cyclic hydrocarbyl sulfites include 1,3,2-dioxathiolane 2-oxide (1,2-ethylene sulfite). The cyclic hydrocarbyl sulfite is preferably in an amount of about 0.5 wt % to about 5 wt %, more preferably about 1 wt % to about 4 wt %, relative to the total weight of the nonaqueous electrolyte solution.

In some embodiments, the electrochemical additive is a saturated cyclic hydrocarbyl sulfate containing two to about six carbon atoms, preferably two to about four carbon atoms, and has a 5-membered or 6-membered ring, preferably a 5-membered ring. One or more substituents can be present on the ring, such as methyl or ethyl groups, preferably one or more methyl groups, more preferably, no substituents are present on the ring. Suitable saturated cyclic hydrocarbyl sulfates include 1,3,2-dioxathiolane 2,2-dioxide (1,2-ethylene sulfate), 1,3,2-dioxathiane 2,2-dioxide (1,3-propylene sulfate), 4-methyl-1,3,2-dioxathiane 2,2-dioxide (1,3-butylene sulfate), and 5,5-dimethyl-1,3,2-dioxathiane 2,2-dioxide. The saturated cyclic hydrocarbyl sulfate is preferably in an amount of about 0.25 wt % to about 5 wt %, more preferably about 1 wt % to about 4 wt %, relative to the total weight of the nonaqueous electrolyte solution.

When the electrochemical additive is a cyclic dioxadithio polyoxide compound, the cyclic dioxadithio polyoxide compound contains two to about six carbon atoms, preferably two to about four carbon atoms, and has 6-membered, 7-membered, or 8-membered ring. Preferably, the cyclic dioxadithio polyoxide compound contains two to about four carbon atoms, and has 6-membered or 7-membered ring. One or more substituents can be present on the ring, such as methyl or ethyl groups, preferably one or more methyl groups, more preferably, no substituents are present on the ring. Suitable cyclic dioxadithio polyoxide compounds include 1,5,2,4-dioxadithiane 2,2,4,4-tetroxide, 1,5,2,4-dioxadithiepane 2,2,4,4-tetraoxide (cyclodisone), 3-methyl-1,5,2,4-dioxadithiepane 2,2,4,4-tetraoxide, and 1,5,2,4-dioxadithiocane 2,2,4,4-tetraoxide; 1,5,2,4-dioxadithiane 2,2,4,4-tetroxide is preferred. The cyclic dioxadithio polyoxide compound is preferably in an amount of about 0.5 wt % to about 5 wt %, more preferably about 1 wt % to about 4 wt %, relative to the total weight of the nonaqueous electrolyte solution.

The phrases "another lithium-containing salt" and "other lithium containing salt" indicate that there are at least two lithium salts used in the preparation of the electrolyte solution. When the electrochemical additive is another lithium-containing salt, it is preferably in an amount of about 0.5 wt % to about 5 wt %, more preferably about 1 wt % to about 4 wt %, relative to the total weight of the nonaqueous electrolyte solution. Suitable lithium-containing salts include all of the lithium-containing salts listed above; lithium di(fluoro)(oxalato)borate and lithium bis(oxalato)borate are preferred.

Mixtures of any two or more of the foregoing electrochemical additives can be used, including different electrochemical additives of the same type and/or electrochemical additives of different types. When mixtures of electrochemical additives are used, the combined amount of the electrochemical additives is about 0.25 wt % to about 5 wt %, more preferably about 0.5 wt % to about 4 wt %, relative to the total weight of the nonaqueous electrolyte solution. Mixtures of an unsaturated cyclic carbonate and a saturated cyclic hydrocarbyl sulfite or mixtures of a cyclic sultone, a tris(trihydrocarbylsilyl) phosphite, and a cyclic dioxadithio polyoxide compound are preferred.

Preferred types of electrochemical additives include saturated cyclic hydrocarbyl sulfates, cyclic sultones, another lithium-containing salt, especially when not used with other electrochemical additives. More preferably, the saturated cyclic hydrocarbyl sulfate is in an amount of about 1 wt % to about 4 wt %, the cyclic sultone is in an amount of about 0.5 wt % to about 4 wt % or in an amount of about 1.5 wt % to about 12 wt %, and another lithium-containing salt is in an amount of about 1 wt % to about 4 wt %, each relative to the total weight of the nonaqueous electrolyte solution.

When the electrochemical additive is selected from vinylene carbonate, 4-fluoro-ethylene carbonate, tris(trimethylsilyl)phosphite, triallyl phosphate, 1,3-propane sultone, 1,3-propene sultone, 1,3,2-dioxathiolane 2-oxide, 1,3,2-dioxathiolane 2,2-dioxide, 1,5,2,4-dioxadithiane 2,2,4,4-tetroxide, lithium di(fluoro)(oxalato)borate, lithium bis(oxalato)borate, lithium hexafluorophosphate, and mixtures of any two or more of these, the electrochemical additive is preferably 1,3,2-dioxathiolane 2,2-dioxide, 1,3-propane sultone, 1,3-propene sultone, tris(trimethylsilyl)phosphite, or lithium bis(oxalato)borate, more preferably 1,3,2-dioxathiolane 2,2-dioxide, 1,3-propene sultone, lithium di(fluoro)(oxalato)borate, or lithium bis(oxalato)borate. More preferred electrochemical additives are 1,3,2-dioxathiolane 2,2-dioxide, lithium di(fluoro)(oxalato)borate, and lithium bis(oxalato) borate. Amounts and preferences therefor are as described above.

In still another embodiment, the 4-bromomethyl-1,3-dioxolan-2-one is preferably in an amount of about 10 wt % or more, more preferably about 11 wt % or more, bromine (atoms) relative to the total weight of the solution. Preferably, the liquid electrolyte medium is ethylene carbonate, ethyl methyl carbonate, or a mixture thereof. More preferably, the lithium-containing salt is lithium hexafluorophosphate, lithium di(fluoro)(oxalato)borate, or lithium bis(oxalato)borate.

Additional ingredients that are often included in electrolyte solutions for lithium batteries can also be present in the electrolyte solutions of the present invention. Such additional ingredients include succinonitrile and silazane compounds such as hexamethyldisilazane. Typically, the amount of an optional ingredient is in the range of about 1 wt % to about 5 wt %, preferably about 2 wt % to about 4 wt %, relative to the total weight of the nonaqueous electrolyte solution.

Another embodiment of this invention provides a process for producing a nonaqueous electrolyte solution for a lithium battery. The process comprises combining components comprising i) a liquid electrolyte medium; ii) a lithium-containing salt; iii) 4-bromomethyl-1,3-dioxolan-2-one; and iv) at least one electrochemical additive as described above. The 4-bromomethyl-1,3-dioxolan-2-one is present in the electrolyte solution in a flame retardant amount. The ingredients can be combined in any order, although it is preferable to add all of the components to the liquid electrolyte medium. Preferences for the liquid electrolyte medium, lithium-containing salt, electrochemical additive(s), and amounts of each component, are as described above.

Still another embodiment of this invention provides a process for producing a nonaqueous electrolyte solution for a lithium battery. The process comprises combining components comprising i) a liquid electrolyte medium; ii) a lithium-containing salt; iii) 4-bromomethyl-1,3-dioxolan-2-one; and iv) at least one electrochemical additive selected from vinylene carbonate, 4-fluoro-ethylene carbonate, tris(trimethylsilyl)phosphite, triallyl phosphate, 1,3-propane sultone, 1,3-propene sultone, 1,3,2-dioxathiolane 2-oxide, 1,3,2-dioxathiolane 2,2-dioxide, 1,5,2,4-dioxadithiane 2,2,4,4-tetroxide, lithium di(fluoro)(oxalato)borate, lithium bis(oxalato)borate, lithium hexafluorophosphate, and mixtures of any two or more of these. Preferences for the liquid electrolyte medium, lithium-containing salt, electrochemical additive(s), and amounts of each component, are as described above.

In some preferred embodiments, the electrochemical additive is vinylene carbonate in an amount of about 0.5 wt % to about 3 wt %, relative to the total weight of the nonaqueous electrolyte solution. In other preferred embodiments, the electrochemical additive is vinylene carbonate in an amount of about 8 wt % to about 11 wt %, relative to the total weight of the nonaqueous electrolyte solution.

In some preferred embodiments, the electrochemical additive is 4-fluoro-ethylene carbonate in an amount of about 1 wt % to about 4 wt %, relative to the total weight of the nonaqueous electrolyte solution.

In some preferred embodiments, the electrochemical additive is tris(trimethylsilyl) phosphite in an amount of about 0.2 wt % to about 3 wt %, relative to the total weight of the nonaqueous electrolyte solution.

In some preferred embodiments, the electrochemical additive is triallyl phosphate in an amount of about 1 wt % to about 5 wt %, relative to the total weight of the nonaqueous electrolyte solution.

In some preferred embodiments, the cyclic sultone is 1,3-propane sultone or 1,3-propene sultone in an amount of about 0.5 wt % to about 4 wt %, relative to the total weight of the nonaqueous electrolyte solution.

In some preferred embodiments, the cyclic sultone is 1,3-propane sultone in an amount of about 1.5 wt % to about 12 wt %, relative to the total weight of the nonaqueous electrolyte solution.

In some preferred embodiments, the electrochemical additive is 1,3,2-dioxathiolane 2-oxide (ethylene sulfite) in an amount of about 1 wt % to about 4 wt %, relative to the total weight of the nonaqueous electrolyte solution.

In some preferred embodiments, the electrochemical additive is 1,3,2-dioxathiolane 2,2-dioxide (ethylene sulfate) in an amount of about 1 wt % to about 4 wt %, relative to the total weight of the nonaqueous electrolyte solution.

In some preferred embodiments, the electrochemical additive is 1,5,2,4-dioxadithiane 2,2,4,4-tetroxide in an amount of about 1 wt % to about 4 wt %, relative to the total weight of the nonaqueous electrolyte solution.

In some preferred embodiments, the electrochemical additive is lithium bis(oxalato)borate in an amount of about 1 wt % to about 4 wt %, relative to the total weight of the nonaqueous electrolyte solution.

In some preferred embodiments, the electrochemical additive is lithium di(fluoro)(oxalato)borate in an amount of about 1 wt % to about 4 wt %, relative to the total weight of the nonaqueous electrolyte solution.

Mixtures of any two or more of the foregoing electrochemical additives can be used. When mixtures of electrochemical additives are used, the combined amount of the electrochemical additives is about 0.25 wt % to about 5 wt %, more preferably about 0.5 wt % to about 4 wt %, relative to the total weight of the nonaqueous electrolyte solution. Mixtures of vinylene carbonate and 1,3,2-dioxathiolane 2-oxide, mixtures of vinylene carbonate and 1,3-propane sultone, or mixtures of 1,3-propene sultone, tris(trimethylsilyl) phosphite, and 1,5,2,4-dioxadithiane 2,2,4,4-tetroxide are preferred.

Preferred electrochemical additives include 1,3,2-dioxathiolane 2,2-dioxide, 1,3-propene sultone, 1,3-propane sultone, tris(trimethylsilyl)phosphite, lithium di(fluoro)(oxalato)borate, and lithium bis(oxalato)borate, especially when not used with other electrochemical additives. More preferably, 1,3,2-dioxathiolane 2,2-dioxide is in an amount of about 1 wt % to about 4 wt %, 1,3-propene sultone is in an amount of about 0.5 wt % to about 4 wt %, 1,3-propane sultone is in an amount of about 0.5 wt % to about 4 wt %, 1,3-propane sultone is in an amount of about 1.5 wt % to about 12 wt %, tris(trimethylsilyl)phosphite is in an amount of about 0.2 wt % to about 3 wt %, lithium di(fluoro)(oxalato)borate is in an amount of about 1 wt % to about 4 wt %, and lithium bis(oxalato)borate is in an amount of about 1 wt % to about 4 wt %, each relative to the total weight of the nonaqueous electrolyte solution.

Yet another embodiment of this invention provides a process for producing a nonaqueous electrolyte solution for a lithium battery. The process comprises combining components comprising i) a liquid electrolyte medium; ii) a lithium-containing salt; and iii) 4-bromomethyl-1,3-dioxolan-2-one. The 4-bromomethyl-1,3-dioxolan-2-one is present in the electrolyte solution in a flame retardant amount. The ingredients can be combined in any order, although it is preferable to add all of the components to the liquid electrolyte medium. Preferences for the liquid electrolyte medium, lithium-containing salt, and amounts of each component, are as described above.

Another embodiment of this invention provides a process for producing a nonaqueous electrolyte solution for a lithium battery. The process comprises combining components comprising i) a liquid electrolyte medium; ii) a lithium-containing salt; and iii) 4-bromomethyl-1,3-dioxolan-2-one.

The nonaqueous electrolyte solutions of the present invention, which contain 4-bromomethyl-1,3-dioxolan-2-one and usually contain one or more electrochemical additives, are typically used in nonaqueous lithium batteries comprising a positive electrode, a negative electrode, and the nonaqueous electrolyte solution. A nonaqueous lithium battery can be obtained by injecting a nonaqueous electrolyte solution between the negative electrode and the positive electrode optionally having a separator therebetween.

The following examples are presented for purposes of illustration, and are not intended to impose limitations on the scope of this invention.

In Example 1, a modified horizontal UL-94 test was performed. This modified horizontal UL-94 test is quite similar to known, published horizontal UL-94 tests. See in this regard, e.g., Otsuki, M. et al. "Flame-Retardant Additives for Lithium-Ion Batteries." *Lithium-Ion Batteries*. Ed. M. Yoshio et al. New York, Springer, 2009, 275-289. The modified UL-94 test was as follows:

Wicks were cut from round fiberglass wick, and cut edges were made smooth, and then dust and particles were removed from the wick surface. The wicks were dried for 20 hours at 120° C. prior to testing. Wicks were 5±0.1 inch (12.7±0.25 cm) long. Each specimen to be tested was prepared in a dry box in a 4 oz. (120 mL) glass jar, by combining the desired amount of flame retardant and, when present, electrochemical additive, with the desired amount of a plain electrolyte solution, e.g.; 8 wt % of the brominated flame retardant, 2 wt % of the electrochemical additive, and 90 wt % of the plain electrolyte solution were combined to form the electrolyte solution containing the flame retardant. Prior to combination with the flame retardant, the plain electrolyte solution contained 1.2 M $LiPF_6$ in ethylene carbonate/ethyl methyl carbonate (wt ratio 3:7) in a 4 oz. (120 mL) glass jar, Each wick was soaked in the electrolyte solution for 30 minutes.

Each specimen was removed from the electrolyte solution and held over the electrolyte solution until no dripping occurred, and then placed in a 4 oz. (120 mL) glass jar; the cap was closed to prevent electrolyte solution from evaporating.

The burner was ignited and adjusted to produce a blue flame 20±1 mm high.

A specimen was removed from its 4 oz. (120 mL) glass jar, and the specimen was placed on a metal support fixture in a horizontal position, secured at one end of the wick.

If an exhaust fan was running, it was shut off for the test.

The flame was at an angle of 45±2 degrees to the horizontal wick, One way to accomplish this when the burner had a burner tube was to incline the central axis of the burner tube toward an end of the specimen at an angle of 45±2 degrees from the horizontal.

The flame was applied to the free end of the specimen for 30±1 seconds without changing its position; the burner was removed after 30±1 seconds, or as soon as the combustion front on the specimen reached the 1 inch (2.54 cm) mark.

If the specimen continued to burn after removal of the test flame, the time in seconds was recorded, for either the flame to extinguish or for the combustion front (flame) to travel from the 1 inch (2.54 cm) mark to the 4 inch (10.16 cm) mark.

A specimen was considered to be "not flammable" if the flame extinguished when the burner was removed. A specimen was considered to be "flame retardant" if the flame extinguished before reaching the 1 inch (2.54 cm) mark. A specimen was considered to be "self-extinguishing" if the flame went out before reaching the 4 inch (10.16 cm) mark.

Each modified horizontal UL-94 test result reported below is the average of three runs.

EXAMPLE 1

Nonaqueous electrolyte solutions containing 4-bromomethyl-1,3-dioxolan-2-one, prepared as described above, were subjected to the modified UL-94 test described above. Results are summarized in Table 1 below; as noted above, the reported numbers are an average value from three runs.

TABLE 1

| Flame retardant | Flame retardant wt % in soln. | Bromine wt % in soln. | Result | Time to extinguish |
|---|---|---|---|---|
| 4-bromomethyl-1,3-dioxolan-2-one | 25 | 11 | flame retardant | 24 s |

EXAMPLE 2

Additional flammability testing of nonaqueous electrolyte solutions was performed at Sandia National Laboratories. In these thermal abuse tests, a closer approximation was made to the conditions under which electrolytes in abuse conditions need to exhibit non-flammable properties, in particular a cell that is venting in combination with an ignition source. The tests were conducted by filling an 18650-sized battery cell with approximately 5 mL of the nonaqueous electrolyte solution, crimping the cell with a typical cell header assembly, and heating the electrolyte-containing cell at a fixed rate of 5° C./min with a spark-wire ignition source at a fixed position roughly 2 inches above the cell header. At about 200° C., the battery cell began venting, the hot electrolyte solution became aerosolized, and was exposed to the spark-wire ignition source. Each sample was monitored for ignition; non-ignition was considered to pass the test, while ignition of the sample failed the test.

One sample was a nonaqueous electrolyte solution without a flame retardant, and contained 1.2 M $LiPF_6$ in ethylene carbonate/ethyl methyl carbonate (wt ratio 3:7). The rest of the samples contained the desired amount of flame retardant in the electrolyte solution. Results are summarized in Table 2 below. A flame duration of zero (non-ignition) is best, and a short flame duration is better than a longer one. In the results below, the shorter flame durations as compared to the electrolyte solution indicate that the flame retardant significantly reduced the flame duration.

TABLE 2

| Chemical Name | Flame retardant in soln. | Bromine in soln. | Result | Flame duration[2] |
|---|---|---|---|---|
| Electrolyte soln.[1] | 0 | 0 | Fail | ~117 s |
| 4-bromomethyl-1,3-dioxolan-2-one | 25 wt % | 11 wt % | Pass | 0 |
| 4-bromomethyl-1,3-dioxolan-2-one | 25 wt % | 11 wt % | Fail | ~9 s |

[1]Comparative run.

[2]Approximate time of flame duration after ignition.

EXAMPLE 3

Tests of some flame retardants in coin cells were also carried out. Coin cells were assembled using nonaqueous electrolyte solutions containing the desired amount of flame retardant. The coin cells were then subjected to electrochemical cycling of CCCV charging to 4.2 V at C/5, with a current cutoff of C/50 in the CV portion, and CC discharge at C/5 to 3.0 V.

One sample was a nonaqueous electrolyte solution without a flame retardant, and contained 1.2 M $LiPF_6$ in ethylene carbonate/ethyl methyl carbonate (wt ratio 3:7). The rest of the samples contained the desired amount of flame retardant in the electrolyte solution; some solutions also contained an electrochemical additive in addition to the flame retardant. Results are summarized in Tables 3A-3D below; the error range in the Coulombic efficiencies is about 0.5% to about 1.0%. Results reported in Tables 3A-3C are averages from multiple cells except where noted; "multiple cells" usually means two or three cells.

TABLE 3A

| Chemical Name | Flame retardant in soln. | Bromine in soln. | Coulombic efficiency 1st cycle | Coulombic efficiency 10th cycle |
|---|---|---|---|---|
| Electrolyte soln.[1] | 0 | 0 | 81.8% | 99.6% |
| 4-bromomethyl-1,3-dioxolan-2-one | 8 wt % | 3.5 wt % | 63.8% | 99.6% |
| 4-bromomethyl-1,3-dioxolan-2-one | 25 wt % | 11 wt % | 45.5% | 95.7% |
| 4-bromomethyl-1,3-dioxolan-2-one[2] | 25 wt % | 11 wt % | 43.0% | 100.7% |

[1]Comparative run.

[2]Prepared by combining 0.2M $LiPF_6$•in 4-bromomethyl-1,3-dioxolan-2-one with the plain electrolyte solution for a final concentration of 1.02M $LiPF_6$.

TABLE 3B

| Chemical Name | Flame retardant in soln. | Additive 1 in soln. | Coulombic efficiency 1st cycle | Coulombic efficiency 10th cycle |
|---|---|---|---|---|
| 4-bromomethyl-1,3-dioxolan-2-one[1,2] | 25 wt % | 0 | 37.1% | 99.2% |
| 4-bromomethyl-1,3-dioxolan-2-one + vinylene carbonate | 8 wt % | 1 wt % | 51.5% | 99.6% |
| 4-bromomethyl-1,3-dioxolan-2-one + vinylene carbonate | 8 wt % | 2 wt % | 59.8% | 100% |
| 4-bromomethyl-1,3-dioxolan-2-one + vinylene carbonate | 8 wt % | 10 wt % | 60.7% | 99.8% |
| 4-bromomethyl-1,3-dioxolan-2-one + 4-fluoro-ethylene carbonate | 8 wt % | 2 wt % | 52.5% | 97.2% |
| 4-bromomethyl-1,3-dioxolan-2-one + tris(trimethylsilyl)phosphite | 8 wt % | 2 wt % | 64.8% | 98.4% |
| 4-bromomethyl-1,3-dioxolan-2-one + 1,3,2-dioxathiolane 2,2-dioxide | 8 wt % | 2 wt % | 71.3% | 98.0% |
| 4-bromomethyl-1,3-dioxolan-2-one + 1,5,2,4-dioxadithiane 2,2,4,4-tetroxide | 8 wt % | 2 wt % | 63.8% | 99.8% |
| 4-bromomethyl-1,3-dioxolan-2-one + triallyl phosphate | 8 wt % | 2 wt % | 62.6% | 99.5% |
| 4-bromomethyl-1,3-dioxolan-2-one + 1,3-propene sultone | 8 wt % | 2 wt % | 69.6% | 99.5% |
| 4-bromomethyl-1,3-dioxolan-2-one + 1,3-propane sultone | 8 wt % | 2 wt % | 66.1% | 99.6% |
| 4-bromomethyl-1,3-dioxolan-2-one + 1,3-propane sultone[3] | 25 wt % | 2 wt % | 50.3% | 99.0% |
| 4-bromomethyl-1,3-dioxolan-2-one + 1,3-propane sultone[3] | 25 wt % | 6 wt % | 39.5% | 95.6% |
| 4-bromomethyl-1,3-dioxolan-2-one + 1,3-propane sultone[3] | 25 wt % | 10 wt % | 31.4% | 97.0% |
| 4-bromomethyl-1,3-dioxolan-2-one + lithium di(fluoro)(oxalato)borate[1] | 8 wt % | 2 wt % | 74.6% | 99.8% |
| 4-bromomethyl-1,3-dioxolan-2-one + lithium bis(oxalato)borate | 8 wt % | 2 wt % | 67.4% | 99.3% |
| 4-bromomethyl-1,3-dioxolan-2-one + vinylene carbonate[3] | 25 wt % | 2 wt % | 48.2% | 96.8% |
| 4-bromomethyl-1,3-dioxolan-2-one + vinylene carbonate[3] | 25 wt % | 2 wt % | 43.9% | 99.7% |

[1]Data is from single best-performing cell.
[2]Prepared by combining 4-bromomethyl-1,3-dioxolan-2-one (25 wt %), ethylene carbonate (5 wt %), methyl ethyl carbonate (70 wt %), and $LiPF_6$ (1.02M); this was a partial electrolyte replacement test.
[3]Prepared by combining 0.2M $LiPF_6$ in 4-bromomethyl-1,3-dioxolan-2-one with the plain electrolyte solution for a final concentration of 1.02M $LiPF_6$, prior to the addition of vinylene carbonate.

TABLE 3C

| Chemical Name | Flame retardant in soln. | Additive 1 in soln. | Additive 2 in soln. | Coulombic efficiency 1st cycle | Coulombic efficiency 10th cycle |
|---|---|---|---|---|---|
| 4-bromomethyl-1,3-dioxolan-2-one + vinylene carbonate + 1,2-ethylene sulfite[1] | 8 wt % | 2 wt % | 1 wt % | 62.8% | 99.6% |
| 4-bromomethyl-1,3-dioxolan-2-one + 1,3-propene sultone + tris(trimethylsilyl) phosphite + 1,3,2-dioxathiolane 2,2-dioxide | 8 wt % | 0.5 wt % | 0.25 wt %; 0.25 wt %[2] | 63.5% | 99.5% |
| 4-bromomethyl-1,3-dioxolan-2-one + vinylene carbonate + 1,3-propane sultone[3] | 25 wt % | 1 wt % | 1 wt % | 47.9% | 98.7% |

[1]Ethylene sulfite is electrochemical additive 2 at 1 wt %.
[2]The second electrochemical additive (tris(trimethylsilyl)phosphite) and third electrochemical additive (1,3,2-dioxathiolane 2,2-dioxide) are each present at 0.25 wt %.
[3]Prepared by combining 0.2M $LiPF_6$ in 4-bromomethyl-1,3-dioxolan-2-one with the plain electrolyte solution for a final concentration of 1.02M $LiPF_6$, prior to the addition of the additives.

Some flame retardants were tested in coin cells to 100 cycles; results are reported in Table 3D below. Data for each flame retardant below is reported from the single best-performing cell.

TABLE 3D

| Chemical name | Flame retardant in soln. | Additive in soln. | Coulombic efficiency 2nd cycle | Coulombic efficiency 100th cycle | Capacity fade 2nd to 100th cycle |
|---|---|---|---|---|---|
| Electrolyte soln.[1] | 0 | 0 | 99.8% | 100.3% | 3.6% |
| 4-bromomethyl-1,3-dioxolan-2-one | 8 wt % | 0 | 97.7% | 100.6% | 9.3% |
| 4-bromomethyl-1,3-dioxolan-2-one + vinylene carbonate[2] | 25 wt % | 2 wt % | 98.2% | 99.3% | 33.7% |
| 4-bromomethyl-1,3-dioxolan-2-one + 1,3-propane sultone[2] | 25 wt % | 2 wt % | 98.7% | 99.6% | 18.6% |

[1]Comparative run.
[2]Prepared by combining 0.2M $LiPF_6$·in 4-bromomethyl-1,3-dioxolan-2-one with the plain electrolyte solution for a final concentration of 1.02M $LiPF_6$, prior to the addition of the additive.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

The invention claimed is:

1. A nonaqueous electrolyte solution for a lithium battery, which solution comprises
   i) a liquid electrolyte medium;
   ii) a lithium-containing salt;
   iii) 4-bromomethyl-1,3-dioxolan-2-one; and
   iv) at least one electrochemical additive
      I) selected from:
         a) unsaturated cyclic carbonates containing three to about six carbon atoms,
         b) fluorine-containing saturated cyclic carbonates containing three to about five carbon atoms and one to about four fluorine atoms,
         c) tris(trihydrocarbylsilyl) phosphites containing three to about nine carbon atoms,
         d) trihydrocarbyl phosphates containing three to about twelve carbon atoms,
         e) cyclic sultones containing three to about eight carbon atoms,
         f) saturated cyclic hydrocarbyl sulfites having a 5-membered or 6-membered ring and containing two to about six carbon atoms,
         g) saturated cyclic hydrocarbyl sulfates having a 5-membered or 6-membered ring and containing two to about six carbon atoms,
         h) cyclic dioxadithio polyoxide compounds having a 6-membered, 7-membered, or 8-membered ring and containing two to about six carbon atoms,
         i) another lithium-containing salt, and
         j) mixtures of any two or more of the foregoing; or
      II) selected from:
      at least one electrochemical additive selected from vinylene carbonate, 4-fluoro-ethylene carbonate, tris(trimethylsilyl)phosphite, triallyl phosphate, 1,3-propane sultone, 1,3-propene sultone, 1,3,2-dioxathiolane 2-oxide, 1,3,2-dioxathiolane 2,2-dioxide, 1,5,2,4-dioxadithiane 2,2,4,4-tetroxide, lithium di(fluoro)(oxalato)borate, lithium bis(oxalato)borate, and mixtures of any two or more of these.

2. A solution as in claim 1 wherein the electrochemical additive in I) is selected from:
   a) unsaturated cyclic carbonates containing three to about four carbon atoms,
   b) fluorine-containing saturated cyclic carbonates containing three to about four carbon atoms and one to about two fluorine atoms,
   c) tris(trihydrocarbylsilyl) phosphites containing three to about six carbon atoms,
   d) trihydrocarbyl phosphates containing three to about nine carbon atoms,
   e) cyclic sultones containing three to about four carbon atoms,
   f) saturated cyclic hydrocarbyl sulfites having a 5-membered ring and containing two to about four carbon atoms,
   g) saturated cyclic hydrocarbyl sulfates having a 5-membered ring and containing two to about four carbon atoms, h) cyclic dioxadithio polyoxide compounds having a 6-membered or 7-membered ring and containing two to about four carbon atoms,
i) another lithium-containing salt, and
j) mixtures of any two or more of the foregoing.

3. A solution as in claim 1 wherein the electrochemical additive in I) is selected from:
   a) an unsaturated cyclic carbonate in an amount of about 0.5 wt % to about 12 wt %, relative to the total weight of the nonaqueous electrolyte solution,
   b) a fluorine-containing saturated cyclic carbonate in an amount of about 0.5 wt % to about 8 wt %, relative to the total weight of the nonaqueous electrolyte solution,
   c) a tris(trihydrocarbylsilyl) phosphite in an amount of about 0.1 wt % to about 5 wt %, relative to the total weight of the nonaqueous electrolyte solution,
   d) a trihydrocarbyl phosphate in an amount of about 0.5 wt % to about 5 wt %, relative to the total weight of the nonaqueous electrolyte solution,
   e) a cyclic sultone in an amount of about 0.25 wt % to about 5 wt %, relative to the total weight of the nonaqueous electrolyte solution,
   f) a cyclic sultone in an amount of about 1.5 wt % to about 12 wt %, relative to the total weight of the nonaqueous electrolyte solution,
   g) a saturated cyclic hydrocarbyl sulfite in an amount of about 0.5 wt % to about 5 wt %, relative to the total weight of the nonaqueous electrolyte solution,
   h) a saturated cyclic hydrocarbyl sulfate in an amount of about 0.25 wt % to about 5 wt %, relative to the total weight of the nonaqueous electrolyte solution, 5 wt %, relative to the total weight of the nonaqueous electrolyte solution,
   j) another lithium-containing salt in an amount of about 0.5 wt % to about 5 wt %, relative to the total weight of the nonaqueous electrolyte solution, and
   k) mixtures of any two or more of the foregoing.

4. A solution as in claim 1 wherein the electrochemical additive in I) is a saturated cyclic hydrocarbyl sulfate, a cyclic sultone, or another lithium-containing salt.

5. A solution as in claim 1 wherein the electrochemical additive in I) is
   a saturated cyclic hydrocarbyl sulfate in an amount of about 1 wt % to about 4 wt %, a cyclic sultone in an amount of about 0.5 wt % to about 4 wt %, a cyclic sultone in an amount of about 1.5 wt % to about 12 wt %, a tris(trihydrocarbylsilyl)phosphite in an amount of about 0.2 wt % to about 3 wt %, or another lithium-containing salt in an amount of about 1 wt % to about 4 wt %, each relative to the total weight of the nonaqueous electrolyte solution; or
   1,3,2-dioxathiolane 2,2-dioxide, 1,3-propene sultone, 1,3-propane sultone, tris(trimethylsilyl)phosphite, lithium di(fluoro)(oxalato)borate, or lithium bis(oxalato)borate.

6. A solution as in claim 5 wherein each electrochemical additive is not used with other electrochemical additives.

7. A solution as in claim 1 wherein the electrochemical additive is a mixture of an unsaturated cyclic carbonate and a saturated cyclic hydrocarbyl sulfite, or a mixture of a cyclic sultone, a tris(trihydrocarbylsilyl) phosphite, and a cyclic dioxadithio polyoxide, optionally wherein the combined amount of the electrochemical additives in each mixture is about 0.25 wt % to about 5 wt %, relative to the total weight of the nonaqueous electrolyte solution.

8. A solution as in claim 1 wherein the 4-bromomethyl-1,3-dioxolan-2-one is in an amount of about 10 wt % or more bromine relative to the total weight of the solution, and/or wherein the liquid electrolyte medium is ethylene carbonate, ethyl methyl carbonate, or a mixture thereof, and/or wherein the lithium-containing salt is lithium hexafluorophosphate.

9. A solution as in claim 1 wherein the nonaqueous electrolyte solution further comprises vinylene carbonate in an amount of about 8 wt % to about 11 wt %, relative to the total weight of the nonaqueous electrolyte solution.

10. A nonaqueous lithium battery comprising a positive electrode, a negative electrode, and a nonaqueous electrolyte solution as in claim 1.

11. A solution as in claim 1 wherein the electrochemical additive in II) is selected from: vinvlene carbonate in an amount of about 0.5 wt % to about 3 wt %, relative to the total weight of the nonaqueous electrolyte solution: vinylene carbonate in an amount of about 8 wt % to about 11 wvt %, relative to the total weight of the nonaqueous electrolyte solution: 4-fluoro-ethylene carbonate in an amount of about 1.5 wt % to about 5 wt %, relative to the total weight of the nonaqueous electrolyte solution; tris(trimethylsilyl) phosphite in an amount of about 0.2 NNt % to about 3 wt %, relative to the total weight of the nonaqueous electrolyte solution; triallyl phosphate in an amount of about 1 wt % to about 5 wt %, relative to the total weight of the nonaqueous electrolyte solution: 1,3-propane sultone or 1,3-propene sultone in an amount of about 0.5 wt % to about 4 wt %, relative to the total N eight of the nonaqueous electrolyte solution; 1,3-propane sultone in an amount of about 1.5w t % to about 12 NNt %, relative to the total weight of the nonaqueous electrolyte solution: 1,3,2-dioxathiolane 2-oxide in an amount of about 1 wt % to about 4 wt %, relative to the total weight of the nonaqueous electrolyte solution; 1,3,2-dioxathiolane 2,2-dioxide in an amount of about 1 wt % to about 4 wt %, relative to the total weight of the nonaqueous electrolyte solution; 1,5,2,4-dioxadithiane 2,2,4,4-tetroxide in an amount of about 1 wt % to about 4 wt %, relative to the total weight of the nonaqueous electrolyte solution; lithium di(fluoro)(oxalato)borate in an amount of about 1 wt % to about 4 wt %, relative to the total weight of the nonaqueous electrolyte solution; lithium bis(oxalato)borate in an amount of about 1 wt % to about 4 wt %, relative to the total weight of the nonaqueous electrolyte solution; and mixtures of any two or more of these.

12. A solution as in claim 1 wherein the electrochemical additive in II) is
   selected from 1,3-propane sultone, 1,3-propene sultone, 1,3,2-dioxathiolane 2,2-dioxide, tris(trimethylsilyl) phosphite, lithium di(fluoro)(oxalato)borate, and lithium bis(oxalato)borate; or
   selected from 1,3-propane sultone in an amount of about 0.5 wt % to about 4 wt %, 1,3-propane sultone in an amount of about 1.5 wt % to about 12 wt %, 1,3-propene sultone in an amount of about 0.5 wt % to about 4 wt %, 1,3,2-dioxathiolane 2,2-dioxide, in an amount of about 1 wt % to about 4 wt %, lithium di(fluoro)(oxalato)borate in an amount of about 1 wt % to about 4 wt %, and lithium bis(oxalato)borate in an amount of about 1 wt % to about 4 wt %, each relative to the total weight of the nonaqueous electrolyte solution.

13. A solution as in claim 12 wherein each electrochemical additive is not used with other electrochemical additives.

14. A solution as in claim 1 wherein the electrochemical additive in II) is selected from A) a mixture of vinylene carbonate and 1,3,2-dioxathiolane 2-oxide, B) a mixture of vinylene carbonate and 1,3-propane sultone, and C) a mixture of 1,3-propene sultone, tris(trimethylsilyl)phosphite, and 1,3,2-dioxathiolane 2,2-dioxide, optionally wherein the combined amount of the electrochemical additives in each mixture is about 0.25 wt % to about 5 wt %, relative to the total weight of the nonaqueous electrolyte solution.

15. A process for producing a nonaqueous electrolyte solution for a lithium battery, which process comprises combining components comprising:
   i) a liquid electrolyte medium;
   ii) a lithium-containing salt; and
   iii) 4-bromomethyl-1,3-dioxolan-2-one; and
   iv) at least one electrochemical additive
      I) selected from:
         a) unsaturated cyclic carbonates containing three to about six carbon atoms,
         b) fluorine-containing saturated cyclic carbonates containing three to about five carbon atoms and one to about four fluorine atoms,
         c) tris(trihydrocarbylsilyl)phosphites containing three to about nine carbon atoms,
         d) trihydrocarbyl phosphates containing three to about twelve carbon atoms,
         e) cyclic sultones containing three to about eight carbon atoms,
         f) saturated cyclic hydrocarbyl sulfites having a 5-membered or 6-membered ring and containing two to about six carbon atoms,
         g) saturated cyclic hydrocarbyl sulfates having a 5-membered or 6-membered ring and containing two to about six carbon atoms,
         h) cyclic dioxadithio polyoxide compounds having a 6-membered, 7-membered, or 8-membered ring and containing two to about six carbon atoms,
         i) another lithium-containing salt, and
         j) mixtures of any two or more of the foregoing; or
      II) selected from:
         at least one electrochemical additive selected from vinylene carbonate, 4-fluoro-ethylene carbonate, tris(trimethylsilyl)phosphite, triallyl phosphate, 1,3-propane sultone, 1,3-propene sultone, 1,3,2-dioxathiolane 2-oxide, 1,3,2-dioxathiolane 2,2-dioxide, 1,5,2,4-dioxadithiane 2,2,4,4-tetroxide, lithium di(fluoro)(oxalato)borate, lithium bis(oxalato)borate, and mixtures of any two or more of these.

16. A nonaqueous electrolyte solution for a lithium battery, which solution comprises
   i) a liquid electrolyte medium;
   ii) a lithium-containing salt; and
   iii) 4-bromomethyl-1,3-dioxolan-2-one.

17. A solution as in claim 16 wherein
   the 4-bromomethyl-1,3-dioxolan-2-one is in an amount of about 10 wt % or more bromine relative to the total weight of the solution; and/or
   the liquid electrolyte medium is ethylene carbonate, ethyl methyl carbonate, or a mixture thereof, and/or wherein the lithium-containing salt is lithium hexafluorophosphate.

18. A nonaqueous lithium battery comprising a positive electrode, a negative electrode, and a nonaqueous electrolyte solution as in claim 16.

19. A process for producing a nonaqueous electrolyte solution for a lithium battery, which process comprises combining components comprising:
   i) a liquid electrolyte medium;
   ii) a lithium-containing salt; and
   iii) 4-bromomethyl-1,3-dioxolan-2-one.

20. A process as in claim 19 wherein
   the 4-bromomethyl-1,3-dioxolan-2-one is in an amount of about 10 wt % or more bromine relative to the total weight of the solution; and/or
   wherein the liquid electrolyte medium is ethylene carbonate, ethyl methyl carbonate, or a mixture thereof, and/or wherein the lithium-containing salt is lithium hexafluorophosphate or lithium bis(oxalato)borate.

* * * * *